United States Patent [19]

Seel

[11] Patent Number: 5,211,331
[45] Date of Patent: May 18, 1993

[54] CONTROL IN COMBINATION WITH THERMOSTATICALLY RESPONSIVE ASSEMBLY

[75] Inventor: Timothy P. Seel, Tonawanda, N.Y.

[73] Assignee: Roberts-Gordon, Inc., Buffalo, N.Y.

[21] Appl. No.: 508,969

[22] Filed: Apr. 13, 1990

[51] Int. Cl.$^5$ .............................................. F23N 1/00
[52] U.S. Cl. .......................... 236/15 C; 126/92 AC; 236/91 R; 431/12
[58] Field of Search ............... 236/91 B, 15 C, 91 G, 236/91 R, 38, 11; 126/92 R, 92 AC, 110 F; 431/12; 110/162

[56] References Cited

U.S. PATENT DOCUMENTS

| | | | |
|---|---|---|---|
| 2,160,968 | 6/1939 | Hagen | 110/162 |
| 2,617,864 | 11/1952 | Johnson | 236/91 G |
| 3,394,886 | 7/1968 | Budden | 237/2 |
| 3,399,833 | 9/1968 | Johnson | 237/53 |
| 3,416,512 | 12/1968 | Mintz | 126/94 |
| 3,450,862 | 6/1969 | Kralovec | |
| 3,674,203 | 7/1972 | McGrath | 236/38 |
| 3,861,624 | 1/1975 | Lear | 236/91 G |
| 4,460,123 | 7/1984 | Beverly | 236/46 R |

FOREIGN PATENT DOCUMENTS

| | | |
|---|---|---|
| 0007775 | 2/1980 | European Pat. Off. |
| 0244638 | 11/1987 | European Pat. Off. |
| 2918360 | 11/1979 | Fed. Rep. of Germany |
| 2189314 | 10/1987 | United Kingdom |

OTHER PUBLICATIONS

Air Cond., Htg. & Ventilating, Apr. 1960, pp. 69–71.
"The Most Complete Line of Low-Intensity Infrared Heating Systems in North America", Roberts-Gordon, Inc., F-2105, Oct. 1988.
"CO-RAY-VAC Vented Gas Fired Radiant Systems for Space Heating", Roberts-Gordon, Inc., F-1510E, Jan. 1986.
"CRV-'B' Series With 115 Burners Supplemental Instructions" Roberts-Gordon, Inc., F1794E, Sep. 1987.
"Fuel Savings Start at the Top With a CO-RAY-VAC Radiant Heating System", Roberts-Gordon, Inc. F1418, May 1989.
"The Roberts-Gordon CO-RAY-VAC Radiant Gas Heating System", Roberts-Gordon, Inc. F1418A 25M, 1284.
"CO-RAY-VAC Installation-Operation & Special Instructions", Roberts-Gordon, Inc. F1899E, Mar. 1989.

*Primary Examiner*—William E. Wayner
*Attorney, Agent, or Firm*—John C. Thompson

[57] ABSTRACT

A control assembly in combination with a thermostatically responsive apparatus. In a preferred mode the principles of the present invention are applied to an infra-red heating system of the type including burner assemblies (12, 12') connected in series by a heating pipe (14), the assemblies being further connected by heating pipes (14) to a vacuum pump (40). The pump (40) is driven by a variable-speed electric motor (42) which is responsive to a thermostat (16) which may initiate, through control panel (15), operation of the burner assemblies. The burning rate of the burner assemblies is controlled by varying the speed of the electric motor and this is accomplished by the control assembly (44) which is responsive to indoor and outdoor temperature sensing devices (48, 50). The control assembly is initially programmed with climatic data which is correlated with operational speeds of the pump to give desired thermal operational characteristics of the burners at differing temperature ranges.

12 Claims, 2 Drawing Sheets

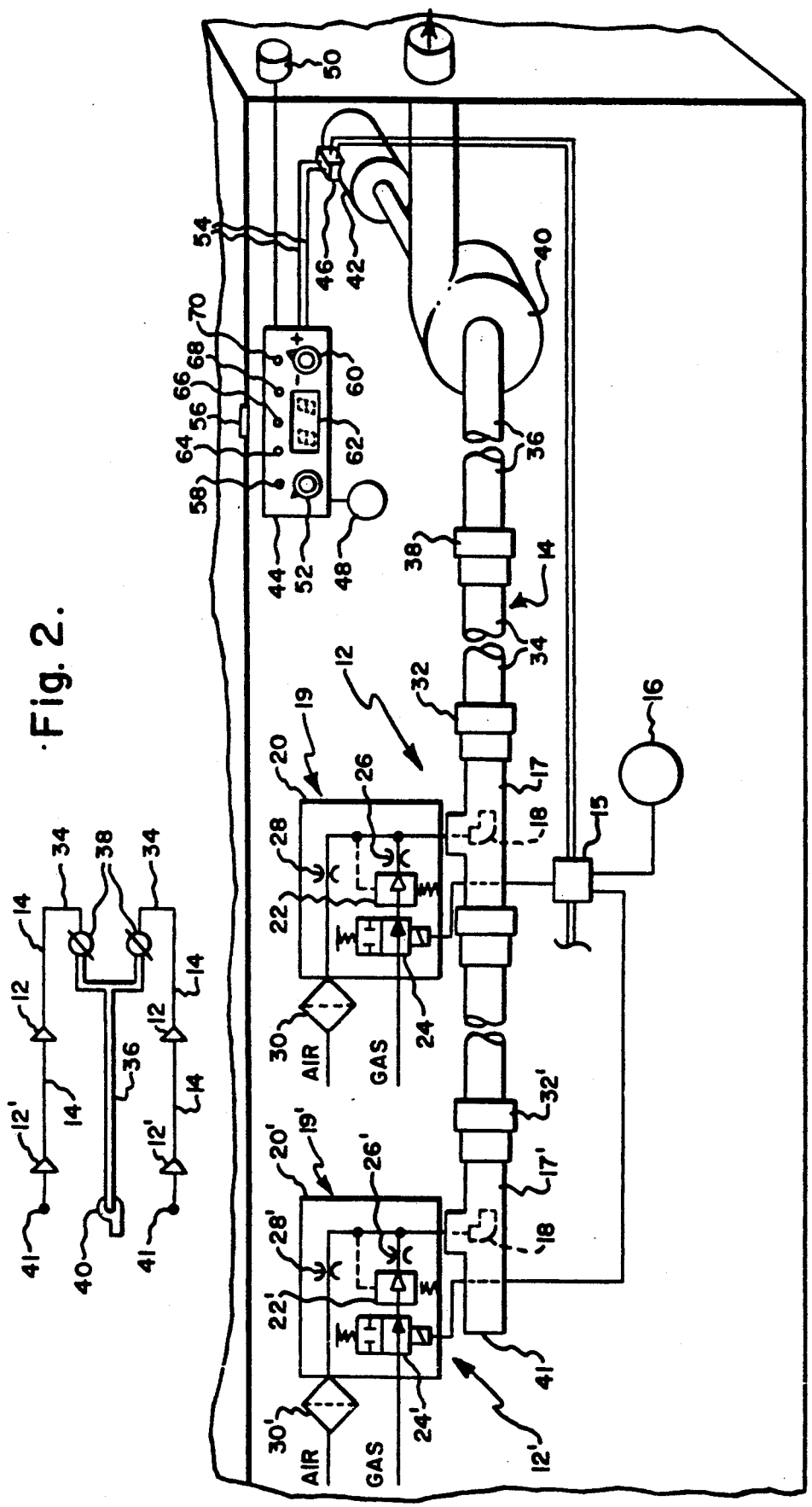

| STATE: CALIFORNIA | | | MONTHS: DEC., JAN., FEB. | |
|---|---|---|---|---|
| | TEMP. RANGE | HOURS | PROB. FACTOR | '% FACTOR |
| LOS ANGELES | 79 | 23 | 1.067 | 0.00 |
| | 74 | 54 | 2.505 | -1.07 |
| | 69 | 120 | 5.566 | -3.57 |
| | 64 | 324 | 15.028 | -9.14 |
| | 59 | 644 | 29.870 | -24.17 |
| | 54 | 581 | 26.948 | -54.04 |
| | 49 | 299 | 13.868 | -80.98 |
| | 44 | 99 | 4.592 | -94.85 |
| | 39 | 12 | 0.557 | -99.44 |
| | 34 | 0 | 0.000 | -100.00 |
| | 29 | 0 | 0.000 | -100.00 |
| | 24 | 0 | 0.000 | -100.00 |
| | 19 | 0 | 0.000 | -100.00 |
| | 14 | 0 | 0.000 | -100.00 |
| | 9 | 0 | 0.000 | -100.00 |
| | | 2156 | 100.000 | |

LOS ANGELES, CALIFORNIA
DEC. JAN. FEB.

TEMP. RANGE
PROBABILITY FACTOR

CONTROL IN COMBINATION WITH THERMOSTATICALLY RESPONSIVE ASSEMBLY

THE FIELD OF THE INVENTION

The present invention relates generally to a thermostatically responsive assembly used for maintaining the temperature within an enclosed space, this invention being illustrated embodied in an infra-red heating system of the type having burner assemblies and radiant heating pipes interconnecting the burner assemblies with a variable-speed vacuum pump. The rate of heating is controlled by a control assembly responsive to indoor and outdoor temperatures, the heating rate of the burner assemblies being varied in accordance with a program stored within the memory of the control assembly which is in turn responsive to climatic data, indoor and outdoor temperatures, and thermostat settings.

BACKGROUND OF THE INVENTION

Thermostatically controlled space-heating and cooling systems are well known in the art. Typical examples are hot-water baseboard heating systems, forced-air cooling systems, and infra-red heating systems. In general, virtually all space-heating and cooling systems in use today have a constant thermal output, which output is selected to provide maximum heating or cooling on those days where the extreme temperature is reached for that area. Most systems which are constructed in the above manner have inherent disadvantages when extremes of temperature are not present. For example, if the system is designed for a temperature differential of 80° F. (70° F. indoor temperature and a −10° F. outdoor temperature), and if there is only a 30° F. difference between the desired temperature inside and the actual temperature outside (40° F.) the system will tend to overshoot, have poor thermal response, have substantially oversized capacity, and poor thermal efficiencies.

As the present invention has been developed for radiant-heating systems, such systems will be described in greater detail below. However, it should be understood that the principles of this invention may be applied to other heating or cooling systems.

When heating an enclosure with a radiant-heating system, such as the type sold under the trade name Co-Ray-Vac by Roberts-Gordon, Inc. of Buffalo, N.Y., it should be recognized that the greatest heating efficiencies are achieved when the unit is operating at design capacity. Thus, in the example given above, the Co-Ray-Vac system when installed in accordance with design specifications, is fully condensing at −10° F. outside temperature. However, when operating at 40° F. outside temperature, although the system will still be fully condensing, it will tend to overshoot when heating, it will have substantially oversized capacity, and will inherently have poor fuel utilization efficiencies due to short cycles and large temperature swings.

It should also be apparent that with such a system that there are constructional costs incidental to having the system fully condensing at design temperatures, where the system is most fuel efficient. However, the condensing radiant pipe or tail pipe, while needed to be of a greater length when the system is operating at its maximum temperature extreme, need not be so long when the system is operating at a temperature considerably less than the extreme. In summary, it should be noted that such systems, when designed to maximum temperature ranges, operate most efficiently only during a very small fraction of the time and also require greater capital costs of installation.

OBJECTS OF THE INVENTION

It is an object of the present to provide a control assembly in combination with a thermostatically responsive assembly used for maintaining the temperature within an enclosed space at a desired temperature setting, the thermostatically responsive assembly having a variable thermal output during its operation, and the control assembly being capable of comparing the indoor and outdoor temperatures and causing the thermostatically responsive assembly to operate at thermal outputs proportional to the actual differences between indoor and outdoor temperatures whereby greater thermal efficiencies may be achieved over a range of conditions with a lower capital investment.

The above object and other objects and advantages of this invention will be more apparent from a consideration of the following detailed description taken in conjunction with the accompanying drawings in which one preferred form of this invention is illustrated.

BRIEF DESCRIPTION OF THE DRAWINGS

FIG. 1 is a partially schematic view illustrating how the principles of this invention may be applied to an infra-red heating system.

FIG. 2 is a schematic layout of an alternate design of an infra-red heating system to which the principles of the present invention may be applied.

DETAILED DESCRIPTION

Figures 3, 4:
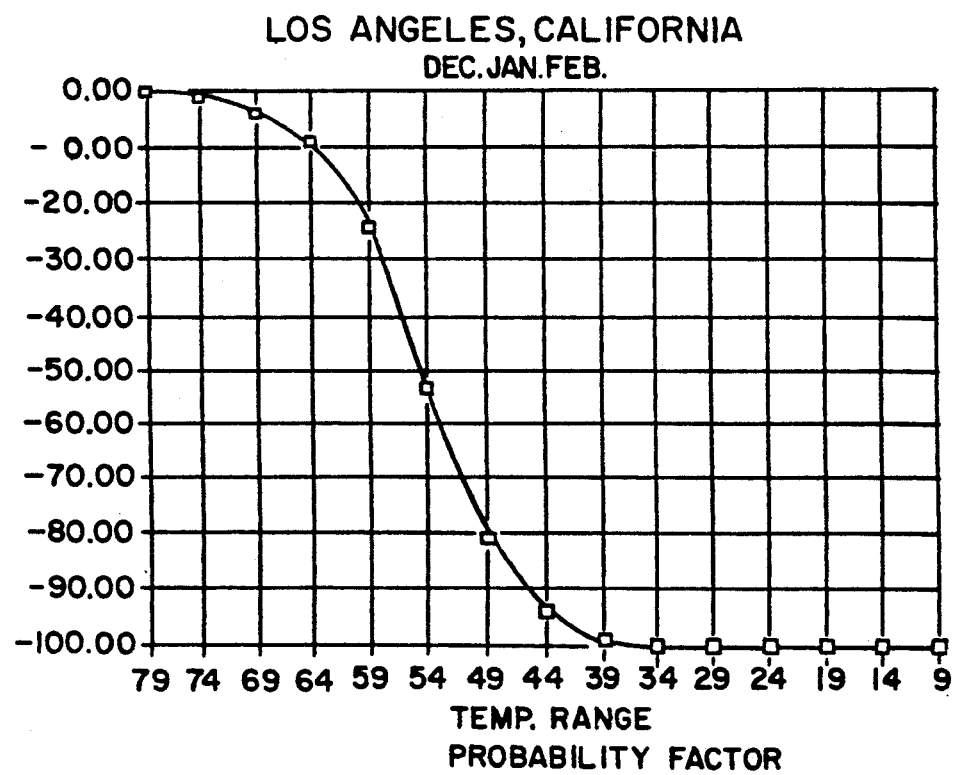
FIG. 3 is a table showing climate design data.
FIG. 4 is a graph showing the climate design data set forth in FIG. 3.

The control assembly for the present invention is illustrated in FIGS. 1 and 2 in conjunction with a space-heating system of the infra-red type. Thus, a building 10 is partially shown in FIG. 1, and the space within the building is the enclosed space which is to be heated. The infra-red space-heating system illustrated in FIG. 1 includes burner assemblies 12, which burner assemblies are coupled to radiant heating pipes indicated generally at 14. More than a single burner assembly is shown in FIG. 1, the second burner assembly being identical to the first burner but being indicated at 12'. It should the noted at this point that a single burner assembly can be connected to the heating pipes 14, or a plurality of burner assemblies such as burner assemblies 12 and 12', may be connected to the heating pipes 14 in series. In addition, as indicated in FIG. 2 burner pipes 14 may be connected to each other in parallel as well as in series.

Each of the burner assemblies 12 is a thermostatically responsive unit and to this end each of the burner units is coupled to a control panel 15 which is also coupled to a thermostat 16. When the temperature within the building 10 drops below the setting of the thermostat 16 a signal will be initiated by the control panel to cause of the operation of the burner assemblies in a manner which will be more fully described below.

Each of the burner assemblies 12 and 12' includes a combustion chamber 17 which has a generally cylindrical cross-sectional configuration, there being a burner head 18 disposed within the combustion chamber. Fluid control means, indicated generally at 19 (or 19'), are provided for initiating a flow of combustible gases to the burner 18 and are mounted within a housing aor enclosure 20. Each of the fluid control means 19 includes a combustible gas supply including a zero-pressure regulator 22, a control valve 24, and a restrictor or orifice 26. An air line joins the gas line downstream of the orifice 26, the air line also being provided with an orifice 28 and an air filter 30, which filter may be mounted on the exterior of the housing 20. If the solenoid-controlled valve 24 is switched an open position, as shown in FIG. 1, and if a vacuum is drawn at the burner 18, a mixture of air and gas will be drawn through the burner 18, which mixture will have the same proportion to one another at all vacuums. Thus, if the vacuum within chamber 17 is increased the flow of air and gas will be increased thereby increasing the fueling or burning rate. This form of construction of a burner head and fluid control means is well known in the art and is commercially available from Roberts-Gordon under the trade name Co-Ray-Vac and is also illustrated in U.S. Pat. No. 3,394,886.

The heating pipes 14 are coupled to the combustion chamber 17 by couplings 32. The heating pipes include radiant pipes 34 which extend between the burner assemblies 12 and 12' and which also extend away from the last burner assembly 12 in the series. The last radiant pipe 34 in the series is coupled to a tail pipe or condensate pipe 36 by a further coupling 38 which may be provided with a suitable damper. The end of the tail pipe furthest away from the burner assembly 12 is in turn coupled to the inlet of a vacuum pump 40, which vacuum pump discharges gases to the exterior of the building. While not shown, the vacuum pump has associated therewith a condensate collector.

The system described up to this point is commercially available under the trade name of Co-Ray-Vac from Roberts-Gordon, Inc. in Buffalo, N.Y. These systems may be configured to differing buildings and when built in accordance with design specifications they are fully condensing systems at the maximum rated heating load. Thus, while the gases passing through the radiant pipes 34 are above the boiling point of water, as the gases pass through the tail pipes 36 the temperature falls below the boiling point of water to permit the water vapor to condense. Accordingly, the tail pipes are typically lined with a porcelainized material to prevent these pipes from rusting. In prior art designs the burners are typically operated at their rated capacity by drawing a vacuum thereon equal to 2.5 inches of water on the end vent of that burner furthest away from the pump 40, the end vent being illustrated at 41 in FIG. 1. Thus, the damper in coupling 38 will normally be so positioned that a vacuum equivalent to 2.5 inches of water will be drawn at the end vent 41 during operation of the pump. This will be the case whether or not the space-heating system is designed as in FIG. 1 with just a single line or whether there are plural lines as in FIG. 2.

In prior art designs the pump has been driven at a single speed. However, it has been recognized that by varying the speed of the pump it may be possible to vary the thermal output of each of the burner assemblies 12. Thus, if a vacuum is drawn at end vent 41 equal to 2.25 inches of water the infra-red heating system will be caused to be operated at approximately 90 percent of its rated capacity. For example, if the burner assembly 12 (or 12') is rated at 50,000 Btus per hour it will have that output at 2.5 inches of vacuum at the end vent 41. However, if the vacuum pressure at end vent 41 is only 2.25 inches of water then the output will be reduced from 50,000 Btus per hour, because there will be a lower fueling rate as less air and less gas will be introduced into the burner assembly to 45,000 Btus.

Existing systems are designed so that they can heat a building satisfactorily 99 percent of the time in accordance with standard ASHRAE procedures. Thus a heating system is designed to provide maximum heating for an outside temperature which is reached in only one day out of 100. Thus, most of the time the heating capacity designed into a system is not fully utilized. This causes inefficiencies in operation and temperature swings within a building when the system is only operating now and then. It has been additionally recognized that when the output speed of the pump is varied to draw proportionately smaller vacuums, the burner assemblies will have lower thermal outputs, leading to greater thermal efficiencies in operation. In addition, because of the greater efficiencies in operation of lower vacuums (or outputs) it is also possible to reduce the capital costs of such a system since they need not be designed for the most extreme days. Thus, a system can be designed which is only fully condensing 90 percent of the time but which will operate at much higher efficiencies when the differences between indoor and outdoor temperatures are not extreme by reducing the thermal output of the burner assembly.

Therefore, in accordance with these principles, a variable-speed electric motor 42 is provided for driving the pump 40 and an operational control means 44 for controlling the thermal output is also provided, which operational control means is coupled on its output side to an electric motor speed control module 46 and on its input side to indoor and outdoor temperature sensing devices 48 and 50. The operational control means 44 includes a microprocessor and it is coupled with the motor speed control 46 in such a manner that the operational speed of the motor 42 can be varied to establish various end vent vacuums dependent upon climatic data programmed into the control means 44.

The characteristics of the present invention can be more fully understood from the following discussion of the manner in which a system of the present invention is designed and started up. Initially, an engineer will determine the heat loss for the enclosed space, say the entire space within the building 10, by using standard ASHRAE procedures and considering the lowest design temperature (99 percent occurrence level temperature; that is, the temperature which occurs only 1 percent of the heating season). As can be seen from the data set forth in FIGS. 3 and 4 which are specific for the Los Angeles, Calif., heating season of December, January, and February, the lowest design temperature would be approximately 41° F. The engineer would next choose a burner or burners having the desired thermal output based upon the desired temperature to which the building is to be heated on the coldest days, for example 70° F. The system layout would then be designed using the required number of burners to satisfy the heat loss based upon the previous considerations.

The engineer will next determine programming check points to be used in the installation to set up the program of the operational control means 44. The check points will be the difference between indoor and outdoor temperatures (the indoor temperature less the outdoor temperature) at 99 percent, 90 percent, 80 percent, 70 percent, and 60 percent occurrence levels. As can be see from FIG. 4 the graph these check points will occur at 45° F., 49° F., 51° F., and 53° F., respectively. Thus, at 41° F. there will be a 29° F. temperature difference, at 45° F. there will be a 25° F. difference, at 49° F. a 21° F. difference, at 51° F. a 19° F. difference, and at 53° F. a 17° F. difference.

The engineer is now ready to start up the system. Initially, all of the burner assemblies will be energized by raising the thermostat 16 to a suitable level. When this occurs, the control panel will initially cause the motor 42 to operate to purge the system. Then, after a limited period of time, the valves 24 will open and the burners 18 will be ignited in a manner well known to those skilled in the art. During the initial start up, the entire system will be allowed to come to an equilibrium which will take approximately 30 to 35 minutes. At this point in time the pump speed 40 will be adjusted to its maximum level. This is done by adjusting control knob 52 of the operational control means which will in turn, acting through control lines 54 adjust the electric motor speed control module in such a manner that the speed of the pump 40 is increased to its maximum rate. The system will now be balanced out by using the dampers in couplings 38 so that each branch end vent will draw 2.5 inches water column. After the system has been balanced to provide 2.5 inches of water column vacuum at each branch end vent it is now necessary to program the operational control means. This is done by pressing the program button 56 in the operational control means 44. Initially, the stage one indicator 58 lights to indicate that programming is in process. One hundred percent delta T (29° F. in the Los Angeles example) will now be dialed in by control knob 60, the delta T being shown in indicator panel 62 which may consist of standard light emitting diodes. After the 100 percent delta T has been dialed in the program button 56 is again pressed. At this time the 100 percent speed capacity has been stored with the 100 percent delta T input data. When the program button is pressed the second time the stage two indicator 64 lights. The manual speed control knob 52 will be adjusted to give a 2.25 degree end vent vacuum and a 90 percent delta T will be dialed in by control knob 60, this being 25° F. in the Los Angeles example. The program button 56 will again be pressed causing the 90 percent speed capacity and the 90 percent delta T input data to be stored and also to commence stage three programming which will be indicated by light 66. The manual speed control will now be adjusted to a 1.75 inch end vent vacuum and the 80 percent delta T (21° F. in the Los Angeles example) will now be dialed in. When the program button 56 is again pressed the fourth light 68 will come on to indicate that the fourth stage should be programmed, the third stage programming having been stored in memory. To continue with the Los Angeles example, during the fourth stage a 70 percent vacuum of 1.25 inches water column is dialed in through control knob 52 and the 70 percent capacity delta T of 19° F. is stored in memory. During the fifth stage a 60 percent of 0.75 inches water column is adjusted through control knob 52 and the 60 percent capacity of delta T of 17° F. is dialed in. The programming is completed after the fifth stage by dialing in the target indoor temperature of 70° F. in the example given. The program button is then pressed one last time to turn off all stage indicator lights and to set the program.

The foregoing programming is required as the algorithm embedded within the microprocessor is not empirically capable of setting the motor speed control as the vacuum drawn on the end vent is dependent upon the overall layout of the system and is not directly proportional to pump speed. In any event, the microprocessor utilizes the following algorithm:

$$\left[\left[\left(\frac{SP - t_i}{\Delta t_{act}}\right) \times K\right] + 1\right] \times F = V$$

where
- SP = indoor ambient control set point (target temp.)
- $t_i$ = instantaneous indoor temperature
- $t_o$ = instantaneous outdoor temperature
- $t_{act}$ = instantaneous building envelope differential temperature ($= t_i - t_o$)
- K = constant
- F = correlation function of ($SP - t_o$)
- V = function signal (output from control) determining vacuum pump operating speed NOTE: Correlation function (F) is determined via programming of the control means with datum points specific to an application site's climate history.

The functional signal V will determine the firing capacity of the burner. For example, again using the Los Angeles climate data, when the indoor temperature is 65° F. and the outdoor temperature is 41° F., with K being equal to 1, the signal to function processor is equal to 1.2 times F or a firing capacity of 100 percent. If the indoor temperature is an actual 69° F. and the outdoor temperature is 49° F. the firing capacity will be approximately 84 percent. If the indoor is 69° F. and the outdoor is 53° F. the firing capacity will be approximately 63 percent. If the indoor temperature is an actual 68° F. and the outdoor temperature is an actual 58° F. the firing capacity will be at 72 percent. In this connection it should be noted that the minimum firing rate programmed into the microprocessor will be a 60 percent firing rate and this is subjectively determined based upon the system so that undue stress areas will not be created when firing at too low a rate.

While the present invention has been described in detail in connection with a space-heating system of the radiant or infra-red type, it should be appreciated that the principles of this invention may be applied to other thermostatically controlled systems for regulating the temperature within a space. For example, the present invention may find application to a hot-water baseboard heating system wherein the boiler firing rate may be varied. Similarly, the present invention may also find application in an office air-conditioning system wherein the air-conditioning unit may have differing cooling rates.

What is claimed is:

1. The combination of a thermostatically responsive unit used for maintaining the temperature within an enclosed space at a desired temperature setting, said thermostatically responsive unit having a variable thermal output during its operation; and a control assembly including
   - an indoor temperature measuring device, and
   - an outdoor temperature measuring device; characterized by the control assembly further including
   - regulating means for causing the thermal output of the unit to be varied during operation of the unit, and
   - operational control means for comparing the indoor and outdoor temperatures and for causing the regulating means to in turn cause the unit to operate at thermal outputs proportional to the actual difference between the compared outdoor and indoor temperatures, whereby greater thermal efficiencies may be achieved over a range of conditions with a lower capital investment.

2. The combination as set forth in claim 1 wherein the regulating means includes a variable speed electric motor and an electric motor speed control module, which module receives electrical control signals from the operational control means.

3. The combination as set forth in claim 1 wherein the operational control means is a programmable device which initiates a signal to the regulating means dependent upon the temperature difference between indoor and outdoor temperatures and the thermostat set point designed into the system.

4. The combination as set forth in claim 3 wherein the operational control means is initially programmed with climate design data and a desired temperature for the enclosed space.

5. The combination as set forth in claim 4 wherein the climate design data programmed into the operational control means includes the maximum temperature difference between the desired temperature for the enclosed space and the extreme temperature encountered outside of the enclosed space during only 1 percent of season.

6. An improved thermostatically responsive assembly used for maintaining the temperature within an enclosed space at a desired temperature setting; said thermostatically responsive assembly comprising:
a unit having a variable thermal output when operated; and
control means for causing said unit to operate at varying thermal outputs when a thermal output is called for by a thermostat, said control means including
an indoor temperature measuring device,
an outdoor temperature measuring device,
regulating means for causing the thermal output of the unit to be varied, and
operational control means for comparing the indoor and outdoor temperatures and for causing the regulating means to in turn cause the unit to operate at thermal outputs proportional to the actual differences between the compared indoor and outdoor temperatures whereby greater thermal efficiencies may be achieved over a range of conditions with a lower capital investment.

7. An improved space-heating system of the type having a burner assembly for burning combustible gas and air, heating pipes and thermostatically operated control means for initiating a control signal, the burner assembly including a combustion chamber, a burner head disposed within the combustion chamber, and fluid control means for supplying combined air and combustible gas to the burner head in response to both a control signal and pressure below ambient in the combustion chamber, the volume of both the air and the combustible gas varying in proportion to the pressure differential between ambient and the vacuum pressure within the combustion chamber, the heating pipes extending away from the combustion chamber, the products of combustion being conveyed through the heating pipes, the heating pipes including a radiant pipe coupled to the combustion chamber and a tail pipe coupled to the radiant pipe; wherein the improvement comprises:
a variable-speed vacuum pump assembly coupled to the tail pipe and capable of operating at varying speeds to vary the vacuum pressure and the fueling rate within the combustion chamber, the pump assembly including a pump and a variable-speed drive; and
a control assembly for varying the operating speed of the vacuum pump assembly to thereby vary the fueling rate of the burner assembly when the operation of the burner assembly has been initiated.

8. The space-heating system as set forth in claim 7 wherein a plurality of burner assemblies are provided, which burner assemblies are coupled to each other in series by radiant pipes which extend from one combustion chamber to another, and wherein the tail pipe is coupled at one end to the last radiant pipe in series and at the other end to the variable-speed vacuum pump.

9. An improved space-heating system of the type having a burner assembly for burning combustible gas and air, heating pipes and thermostatically operated control means for initiating a control signal, the burner assembly including a combustion chamber, a burner head disposed within the combustion chamber, and fluid control means for supplying combined air and combustible gas to the burner head in response to both a control signal and pressure below ambient in the combustion chamber, the volume of both the air and the combustible gas varying in proportion to the pressure differential between ambient and the vacuum pressure within the combustion chamber, the heating pipes extending away from the combustion chamber, the products of combustion being conveyed through the heating pipes, the heating pipes including a radiant pipe coupled to the combustion chamber and a tail pipe coupled to the radiant pipe; wherein the improvement comprises:
a variable speed vacuum pump assembly coupled to the tail pipe and capable of operating at varying speeds to vary the vacuum pressure and the fueling rate within the combustion chamber, the pump assembly including a pump and a variable-speed drive;
a control assembly for varying the operating speed of the vacuum pump assembly to thereby vary the fueling rate of the burner assembly when the operation of the burner assembly has been initiated, the control assembly including inside and outside temperature measuring devices, and operational control means for matching the actual heating requirement to the heat load on a nearly instant basis by responding to the measured air temperature difference between the air temperature inside the space being heated and outside air.

10. The improved space-heating system as set forth in claim 9 wherein the operational control means is provided with climate design data.

11. The improved space-heating system as set forth in claim 9 wherein the operational control means is provided with climate design data in the form of design temperature profiles which establish intermediate operational speeds of the vacuum pump to in turn create differing vacuums within the heating pipes so that differing burning rates may be achieved whereby greater thermal efficiencies may be achieved over a range of conditions with a lower capital investment.

12. An improved infra-red space-heating system comprising:
a burner assembly for burning combustible gas, the burner assembly including a combustion chamber, a burner head disposed within the combustion chamber, and fluid control means for supplying combined air and combustible gas to the burner head in response to both a control signal and a pressure below ambient within the combustion chamber, the volume of the combined air and combustible gas varying in proportion to the pressure differential between ambient and the vacuum pressure within the combustion chamber;

heating pipes coupled to said combustion chamber through which products of combustion pass, said products heating said pipes to an elevated temperature for infra-red heating, said heating pipes including a radiant pipe coupled to the combustion chamber, and a tail pipe coupled to the radiant pipe;

a variable-speed vacuum pump assembly coupled to the tail pipe and capable of operating at varying speeds to vary the vacuum pressure within the combustion chamber, the vacuum pump assembly including a vacuum pump and a variable-speed drive, the variable-speed drive including a variable-speed electric motor and an electric motor speed control module;

a thermostat;

control panel means connected to said thermostat for initiating power flow to the electric motor speed control module and a control signal to the fluid control means upon receipt of a signal from said thermostat;

indoor and outdoor temperature measuring devices; and operational control means for comparing the indoor and outdoor temperatures and causing the electric motor speed control module to cause the variable-speed electric motor to operate at a speed selected by the operational control means to provide a thermal output of said burner unit proportional to the actual differences between outdoor and indoor temperatures whereby said system provides for greater thermal efficiencies over a range of temperatures at a lower capital investment.

* * * * *